United States Patent Office 3,832,190
Patented Aug. 27, 1974

3,832,190
ANTI-FOULING PAINT FOR SHIP'S BOTTOM AND STRUCTURES UNDER SEA WATER
Hiroshi Fujimura, Osaka, Yoshio Nose, Hiroshima, and Teiichi Kanazawa, Shimizu, Japan, assignors to Kumiai Chemical Industry Co., Ltd., Tokyo, Japan
No Drawing. Continuation of abandoned application Ser. No. 64,958, Aug. 19, 1970. This application June 2, 1972, Ser. No. 259,344
Int. Cl. C09d 5/14, 5/16
U.S. Cl. 260—15 AF
11 Claims

ABSTRACT OF THE DISCLOSURE

An anti-fouling paint for ship's bottom and structures under sea water comprises an effective amount for controlling sea organisms of a tin compound having the general formula

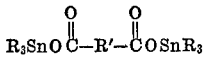

wherein R is an alkyl or a phenyl radical and R' is a halogenated ethylene or a halogenated phenylene radical, and a coating film forming material.

---

This is a continuation application Ser. No. 64,958, filed Aug. 19, 1970, now abandoned.

The present invention relates to an anti-fouling paint for ship's bottom and structures under sea water comprising an effective amount of a tin compound having the general formula

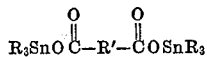

wherein R is an alkyl or a phenyl radical and R' is a halogenated ethylene or a halogenated phenylene radical as an active ingredient and a coating film forming material and further to a method for controlling sea organisms deposited on the ship's bottom and structures under sea water with the same paint.

A commonly used paint for ship's bottom is composed of three paints, i.e., anti-corrosive paint, anti-fouling paint and boot-top paint.

The anti-corrosive paint is used for preventing rust, the anti-fouling paint is used to prevent depositing of foul and the boot-top paint is used for both said purposes. Therefore, the anti-corrosive paint must be adhered to a surface of a steel plate, form a coated film having an excellent brine resistance and have a good adhesivity to the anti-fouling paint or the boot-top paint to be applied thereon. In the case of vinyl series anti-corrosive paint, a wash primer consisting mainly of vinyl butyral resin is previously applied on the steel plate in order to improve an adhesion of said paint to the steel plate and then the paint is applied thereon. The anti-fouling paint aims to prevent depositing of sea organisms, for example, injurious animals, such as Balanus, Serpulids, Bryozoa, Gunicates; injurious plants, such as Ultra pertusa, Enteremorpha, etc., on the ship's bottom and in this case the active ingredient contained in the paint is gradually dissolved in sea water and prevents approaching and depositing of the sea organisms to the ship's bottom.

The present invention uses a tin compound as the active ingredient.

Heretofore, heavy metal compounds, such as copper suboxide, mercury oxide, etc., have been used as the active ingredient. However, said compounds are often used in the form of oxide, so that they react with a varnish component contained in the paint during the storage and are usually unstable. Furthermore, mercury oxide cannot be used for the vinyl series anti-corrosive paint.

Moreover, when a conventional well-known organotin compound, for example, bis(trialkyltin) oxide is mixed with a coating film forming material, the resulting coated film is difficultly dried, blisters are liable to be formed and the storage stability is poor. Furthermore, trialkyltin halide, dialkyltin oxide and the like have problems in the activity, storage stability, etc. In addition, bis(trialkyltin) fumarate is poor in the effect for preventing seaweeds which influence highly a speed of a ship.

The effective period of these known anti-fouling paints for ship's bottom is about one year. Recently, a prolongation of a painting cycle has been demanded strongly in the shipping industry and it is considerably desired to produce the anti-fouling paint having an effective period of more than one year.

The active ingredients according to the present invention are particularly effective to seaweeds, maintain the anti-fouling activity for a long period and require no repair of the coated film for two years.

The active ingredients according to the present invention are listed, for example, as follows:

Compound 1. Bis(tri-isopropyltin)meso-dibromosuccinate

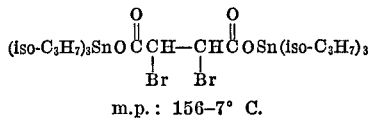

m.p.: 156–7° C.

Compound 2. Bis(tri-isopropyltin)meso-dichlorosuccinate

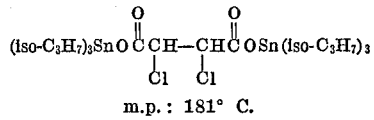

m.p.: 181° C.

Compound 3. Bis(tri-n-propyltin)meso-dichlorosuccinate

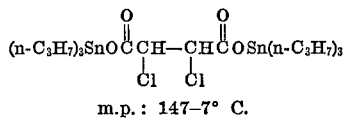

m.p.: 147–7° C.

Compound 4. Bis(tri-n-butyltin)meso-dibromosuccinate

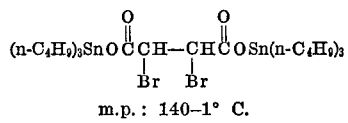

m.p.: 140–1° C.

Compound 5. Bis(tri-n-butyltin)meso-dichlorosuccinate

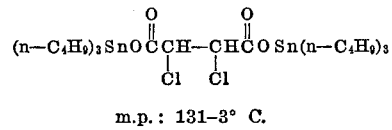

m.p.: 131–3° C.

Compound 6. Bis(triphenyltin)meso-dibromosuccinate

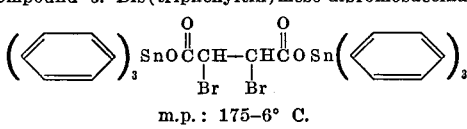

m.p.: 175–6° C.

Compound 7. Bis(tri-n-butyltin)monochloromalate

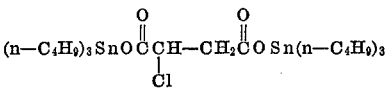

m.p.: 94–7° C.

Compound 8. Bis(triphenyltin)monochloromalate

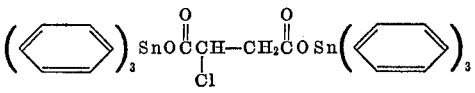

m.p.: 150–6° C

Compound 9. Bis(tri-n-butyltin)tetrachloroterephthalate

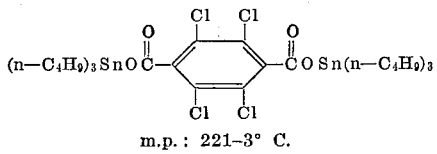

m.p.: 221–3° C.

The anti-fouling paint for ship's bottom and structures under sea water of the present invention containing these compounds as the active ingredient can prevent satisfactorily depositing of the sea organisms, such as shell-fishes, seaweeds, etc., on the ship's bottom even after immersed in sea for 15 months, and particularly, shows an excellent effect to prevent the depositing of seaweeds which cause a reduction of a speed of ships at sea.

Furthermore, the compounds according to the present invention are very smaller in bad odor and lower in toxicity than the conventional organotin compounds, e.g. tributyltin oxide, and further have no stimulation to a mucous membrane and they can be easily handled.

According to the present invention, these compounds are obtained py reacting bis(tri-alkyl or phenyl-tin) oxide with organic acids.

These compounds may be mixed with a coating film forming material in a well-known convenient manner.

As a coating film forming material, use may be made of usual oily or synthetic resin vehicles and also pigments are not limited. As a method for the production of anti-fouling paint, the active ingredient is compounded in such an amount of 4.5 to 25% by weight and the resulting mixture is thoroughly pulverized and kneaded.

The present invention will be explained with respect to the following Preparation Examples and Experimental Examples.

Preparation Example 1

Oily paint (blue colour):

|  | Percent |
|---|---|
| Compound 1 | 20 |
| Titanium white | 10 |
| Cyanine Blue | 1 |
| Barium sulfate | 7 |
| Talc | 6 |
| Aluminium stearate | 1 |
| Rosin | 25 |
| Boiled oil | 10 |
| Solvent naphtha | 20 |
| Total | 100 |

Preparation Example 2

Vinyl chloride paint (red colour):

|  | Percent |
|---|---|
| Compound 4 | 20 |
| Red oxide | 15 |
| Talc | 10 |
| Barium sulfate | 7 |
| Aluminium stearate | 1 |
| Rosin | 12 |
| Chlorinated rubber | 6 |
| Diphenyl chloride | 4 |
| Solvent naphtha | 25 |
| Total | 100 |

Experimental Example 1
(a) Test method

Test plates coated with the anti-fouling paint for ship's bottom of Preparation Example 1 were immersed in sea for two years. In each plate, there was no deposit of sea organisms other than fur and the anti-fouling activity was very high. Furthermore, the coated film did not form blisters and maintained a good normal condition.

(b) Results

| Compound to be tested | After one year | | | |
|---|---|---|---|---|
|  | Balanus | Serpulids | Bryozoa | Ultra pertusa, Enteremorpha |
| Compound 4 | No deposit | No deposit | No deposit | No deposit. |
| Control A | No deposit | No deposit | No deposit | + |

| | After two years | | | |
|---|---|---|---|---|
| Compound 4 | No deposit | No deposit | No deposit | No deposit. |
| Control A | No deposit | + | + | ++ |

Control A: Bis(tributyltin) fumarate.
NOTE: + slightly deposited; ++ considerably deposited.

Exeprimental Example 2
(a) Test method (1) Paint to be tested: Compounds 1 to 9 of organotin compounds according to the present invention and copper suboxide conventionally used were compounded in the mixing ratio as shown in Preparation Example 1, respectively.

(2) Manufacture of test plate: A polished steel plate of 300 x 100 x 1 mm, was coated with the paint prepared in the above item (1) by means of a brush according to the following painting manner.

(3) Painting manner:

|  | Times |
|---|---|
| Wash primer | 1 |
| Anti-corrosive paint | 2 |
| Anti-fouling paint of the present invention or anti-fouling paint containing copper suboxide | 2 |

(4) Immersing method: The above-mentioned test plate was immersed in a depth of 1.5 m. of sea.

The test plate immersed in the sea was taken out at a constant interval, and the area of the sea organisms deposited thereon was measured to obtain a result as shown in the following table.

(b) Results

| Months | 2 | 5 | 9 | 12 | 15 |
|---|---|---|---|---|---|
| Compound: | | | | | |
| 1 | 0 | 0 | 0 | 0 | 1 |
| 2 | 0 | 0 | 1 | 1 | 2 |
| 3 | 0 | 0 | 1 | 1 | 1 |
| 4 | 0 | 0 | 0 | 0 | 0 |
| 5 | 0 | 0 | 1 | 2 | 2 |
| 6 | 0 | 0 | 1 | 1 | 1 |
| 7 | 0 | 0 | 1 | 2 | 2 |
| 8 | 0 | 0 | 1 | 2 | 2 |
| 9 | 0 | 0 | 1 | 1 | 2 |
| Copper suboxide | 0 | 1 | 2 | 2 | 4 |
| Non-treated | 3 | 5 | 5 | 5 | 5 |

NOTE.—5=Deposit on the whole surface of the test plate; 0=No deposit.

A non-treated test plate was coated in such a manner that coatings of wash primer and anti-corrosive paint were 1 time respectively.

What is claimed is:

1. A method for preventing from approaching and depositing of sea organisms to ship's bottom and structures under sea water comprising
applying an effective amount of a tin compound having the formula

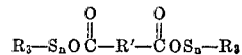

wherein R is a straight chain alkyl or a phenyl radical and R' is a halogenated ethylene or a halogenated phenylene radical to the ship's bottom and structures under sea water.

2. The method as claimed in claim 1, wherein said tin compound is bis(tri-isopropyltin)meso-dibromosuccinate.

3. The method as claimed in claim 1, wherein said tin compound is bis(tri-isopropyltin)meso-dichlorosuccinate.

4. The method as claimed in claim 1, wherein said tin compound is bis(tri-n-propyltin)meso-dichlorosuccinate.

5. The method as claimed in claim 1, herein said tin compound is bis(tri-n-butyltin)meso-dibromosuccinate.

6. The method as claimed in claim 1, wherein said tin compound is bis(tri-n-butyltin)meso-dichlorosuccinate.

7. The method as claimed in claim 1, wherein said tin compound is bis(triphenyltin)meso-dibromosuccinate.

8. The method as claimed in claim 1, wherein said tin compound is bis(tri-n-butyltin)monochloromalate.

9. The method as claimed in claim 1, wherein said tin compound is bis(triphenyltin)monochloromalate.

10. The method as claimed in claim 1, wherein said tin compounds is bis(tri-n-butyltin)tetrachloroterephthalate.

11. The method as claimed in claim 1, wherein said tin compound is applied to ship's bottom and structures under sea water in combination with a coating film forming material selected from the group consisting of boiled oil, solvent naphtha, chlorinated rubber and barium sulfate.

References Cited

UNITED STATES PATENTS

| | | | |
|---|---|---|---|
| 3,542,824 | 11/1970 | Bublitz | 424—288 X |
| 3,211,680 | 10/1965 | Updegraff et al. | 106—15 AF X |
| 3,236,793 | 2/1966 | Robins et al. | 106—15 AF X |
| 3,214,453 | 10/1965 | Stern, Jr. | 106—15 AF X |
| 3,479,380 | 11/1969 | Minieri | 260—429.7 |

FOREIGN PATENTS

| | | | |
|---|---|---|---|
| 4,021,799 | 9/1965 | Japan | 260—429.7 |

ALLAN LIEBERMAN, Primary Examiner

R. ZAITLEN, Assistant Examiner

U.S. Cl. X.R.

106—16, 17; 260—429.7.